United States Patent
Bahl

(10) Patent No.: US 6,957,276 B1
(45) Date of Patent: Oct. 18, 2005

(54) SYSTEM AND METHOD OF ASSIGNING AND RECLAIMING STATIC ADDRESSES THROUGH THE DYNAMIC HOST CONFIGURATION PROTOCOL

(75) Inventor: Pradeep Bahl, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 832 days.

(21) Appl. No.: 09/694,153

(22) Filed: Oct. 23, 2000

(51) Int. Cl.[7] .............................................. G06F 15/16
(52) U.S. Cl. .................. 709/245; 709/226; 709/227; 709/228; 713/100
(58) Field of Search ................................ 709/226, 227, 709/228, 245; 713/100

(56) References Cited

U.S. PATENT DOCUMENTS

| | | | | | |
|---|---|---|---|---|---|
| 5,884,024 | A | * | 3/1999 | Lim et al. ................... | 713/201 |
| 6,009,103 | A | * | 12/1999 | Woundy ..................... | 370/401 |
| 6,012,088 | A | * | 1/2000 | Li et al. ...................... | 709/219 |
| 6,052,725 | A | * | 4/2000 | McCann et al. ............ | 709/223 |
| 6,286,039 | B1 | * | 9/2001 | Van Horne et al. ......... | 709/221 |
| 6,393,484 | B1 | * | 5/2002 | Massarani ................... | 709/227 |
| 6,418,129 | B1 | * | 7/2002 | Fingerhut ................... | 370/328 |
| 6,496,511 | B1 | * | 12/2002 | Wang et al. ................ | 370/401 |
| 6,678,732 | B1 | * | 1/2004 | Mouko et al. .............. | 709/227 |
| 6,684,243 | B1 | * | 1/2004 | Euget et al. ................ | 709/222 |

OTHER PUBLICATIONS

*Introduction to DHCP*, dhcp.org Shortcuts, at http://www.dhcp.org/dhcp–intro.html (last visited Aug. 31, 2000).

(Continued)

*Primary Examiner*—Saleh Najjar
(74) *Attorney, Agent, or Firm*—Leydig Voit & Mayer, LTD

(57) ABSTRACT

Presented is a system and method for providing centralized address management of static IP addresses through the dynamic host control protocol. Static or permanent IP addresses are those addresses assigned by DHCP having an infinite lease time. The assignment of such static IP addresses follows the conventional DHCP mechanism for the assignment of other IP addresses. However, the centralized reclamation of a statically or permanently assigned IP address by a network administrator through the DHCP server presents novel aspects of the invention heretofore unknown. Specifically, through the system and method of the present invention, the DHCP server is capable of reclaiming at any point in time, a statically or permanently assigned IP address by transmitting a DHCP RECLAIM command to the DHCP client, or through its relay agent. In the normal situation, the DHCP client acknowledges the RECLAIM command, allowing the IP address to be placed in the FREE state. If, however, the DHCP client does not respond or the responses are not received by the DHCP server, the DHCP server marks the state of the IP address as DEPRECATED. The state of the IP address will be changed from DEPRECATED to FREE once a number of retries of the RECLAIM process has been completed, or a maximum period of time has passed. Security mechanisms to prevent a malicious attacker from reclaiming static IP address from DHCP clients are also presented.

13 Claims, 5 Drawing Sheets

OTHER PUBLICATIONS

J. Bound (Compaq Computer Corp.), M. Carney (Sun Microsystems, Inc.), and C. Perkins (Nokia Research Center), *Extensions for the Dynamic Host Configuration Protocol for Ipv6 draft–ietf–dhc–dhcpv6exts–12.txt*, Dynamic Host Configuration Working Group of the Internet Engineering Task Force (May 5, 2000), 38 pages, at http://search.ietf.org/internet–drafts/draft–ietf– dhc– dhcpv6exts–12.txt (last visited Aug. 31, 2000).

Peter De Schrijver, Yves T'Joens, and Christian Hublet (Alcatel), *Dynamic host configuration: DHCP reconfigure extension*, Dynamic Host Configuration Working Group of the Internet Engineering Task Force (Jun. 2000), 5 pages, at http://search.ietf.org/internet–drafts/draft–ietf–dhc–pv4–reconfigure–01.txt (last visited Aug. 3, 2000).

J. Bound (Compaq Computer Corp.), M. Carney (Sun Microsystems, Inc.), and C. Perkins (Nokia Research Center), *Dynamic Host Configuration Protocol for IPv6 (DHCPv6) draft–ietf–dhc–dhcpv6–15.txt*, Dynamic Host Configuration Working Group of the Internet Engineering Task Force (May 2000), 56 pages, at http://search.ietf.org/internet–drafts/draft–ietf–dhc–dhcpv6–15.txt (last visited Aug. 31, 2000).

R. Droms (Bucknell University), *Dynamic Host Configuration Protocol*, Network Working Group (Mar. 1997), 40 pages, at http://www.cis.ohio–state.edu/htbin/rfc/rfc2131.html (last visited Jul. 26, 2000).

Stephen Swoyer, *RRAS on Windows 2000 Updated for VPN and NAT*, ENT, Mar. 22, 2000, 5, 5, 34, 4 pages.

Peter Dyson, *Real Choices on the Desktop: A Look at Corel Linux*, Seybold Report on Internet Publishing, Feb. 2000, 3, 3 pages.

P.J. Connoll, *Boost your bandwidth efficiency–Directory–enabled networking reduces your LAN management costs*, InfoWorld, Mar. 27, 2000, 22, 13, 41, 5 pages.

Matt Lake, *Tips for New Arrivals*, PC World, Mar. 2000, 18, 3, 123, 11 pages.

*New Products: Recent Arrivals Make Their Debut*, Computing Canada, Nov. 5, 1999, 25, 42, 35, 7 pages.

Neil Randall, *Dynamic IP Addressing in Windows*, PC Magazine, Sep. 1, 1999, 18, 15, 251, 4 pages.

Michael Surkan, *Router easy on–ramp to Net*, PC Week, Apr. 26, 1999, 16, 17, 78(1), 3 pages.

Steven Cobb, *Safer Internet access*, Databased Web Advisor, Nov. 1997, v15, n11, p72(3), 4 pages.

Scott Werden, *Integrating NT into a UNIX network*, UNIX Review, Jun. 1997, v15, n7, p27(6), 7 pages.

Tom Henderson, *The Windows NT Internet makeover*, LAN Magazine, Nov. 1996, v11, n12, p142(5), 8 pages.

Steve Rigney, *Solve the address mess*, PC Magazine, Mar. 4, 1997, v16, n5, pE01(5), 7 pages.

Eric A. Hall, *Don't Ignore TCP Performance–Tuning*, Network Computing, Jun. 28, 1999, n1013, p. 97, 5 pages.

Allen Robel, Doug Pearson, and Steven Wallace, *ATM WANs: Cornering the Market on Wide Area Data*, Network Computing, Apr. 19, 1999, n1008, p. 77, 7 pages.

Eric A. Hall, *Advanced TCP Options*, Network Computing, Feb. 8, 1999, n1003, p. 110, 4 pages.

Bernard Cole, *Net–based computing under gun to upgrade*, Electronic Engineering Times, Jul. 20, 1998, n1017, p. 71, 2 pages.

Robert G. Moskowitz, *And The Winner Is . . . Us*, Network Computing, Nov. 1, 1994, n513, p45, 3 pages.

Thomas Nolle, *IP needs some business sense*, Network World, Sep. 8, 1997, 41, 3 pages.

Ellen Messmer, *Check Point lays out VPN roadmap*, Network World, Apr. 5, 1999, 51, 1 page.

Samuel Mark Otterstrom, *An Analysis of Population Dispersal and Concentration in the United States, 1790–1990: The Frontier, Long Waves, and The Manufacturing Connection (Migration)*, The Louisiana State University and Agricultural and Mechanical College, vol. 59/01–A of Dissertation Abstracts international (1997), 275, 1 page.

*OSI price cut: USL dramatically reduces prices for core OSI products*, EDGE, on & about AT&T, Dec. 4, 1992, v7, n228, p22(1), 1 page.

Gregory Yerxa, *Firewall & Load–Balancer: Perfect Union?*, Network Computing (Feb. 7, 2000) 84, 4 pages.

Gregory Yerxa, *Sharing the Load Across the Web*, Network Computing (Dec. 13, 1999), 54, 5 pages.

Gregory Yerxa, *F5 Network, RadWare Lead the Pack*, Network Computing (Dec. 13, 1999), 62, 6 pages.

Pankaj Chowdhry, *Alteon Saves Loads of Time*, PC Week (Dec. 14, 1998), 15, 50, 143(1), 3 pages.

Sarah L. Roberts–Witt, *Balancing Web Traffic Gets Dicier*, Internet World (Nov. 16, 1998), 27(1), 3 pages.

*Dynamic Host Configuration (dhc)*, 5 pages, at http://www.letf.org.html.charters.dhc–charter.html (last visited Nov. 12, 2004).

\* cited by examiner

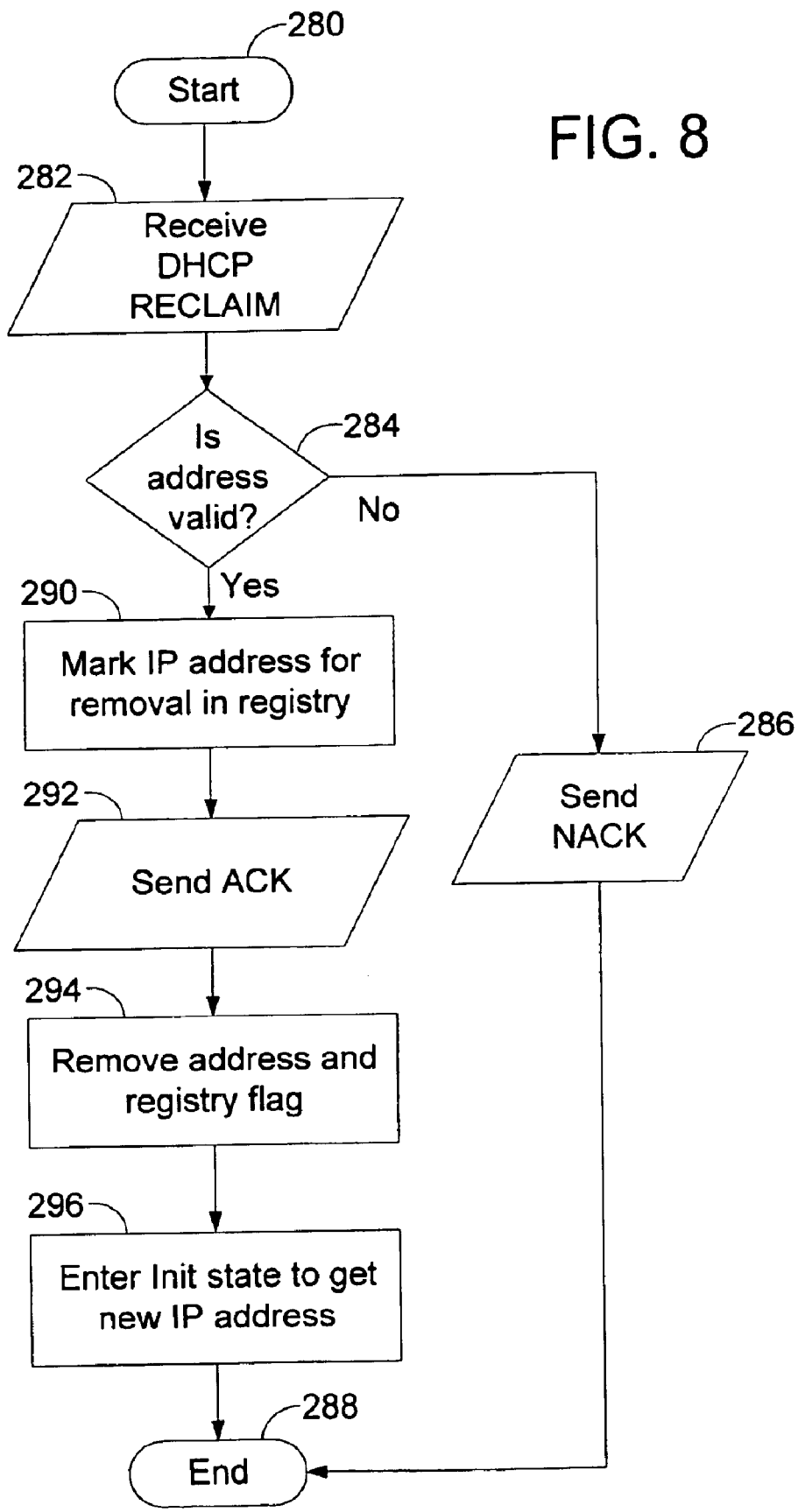

SYSTEM AND METHOD OF ASSIGNING AND RECLAIMING STATIC ADDRESSES THROUGH THE DYNAMIC HOST CONFIGURATION PROTOCOL

TECHNICAL FIELD

This invention relates generally to assignment of IP addresses through the Dynamic Host Configuration Protocol (DHCP), and more particularly to the assignment and reclamation of static IP addresses in a network utilizing DHCP.

BACKGROUND OF THE INVENTION

The Dynamic Host Configuration Protocol (DHCP) provides a mechanism through which computers using TCP/IP can obtain protocol configuration parameters automatically through the network. DHCP is an open standard, developed by the Dynamic Host Configuration Working Group of the Internet Engineering Task Force (IETF). DHCP is based on a client-server paradigm, in which the DHCP client, e.g., a desktop computer, contacts a DHCP server for configuration parameters. The DHCP server is typically centrally located and operated by a network administrator. Because the server is run by a network administrator, DHCP clients can be reliably and dynamically configured with parameters appropriate for the current network architecture.

The most important configuration parameter carried by DHCP is the IP address. A computer must be initially assigned a specific IP address that is appropriate to the network to which the computer is attached, and that is not assigned to any other computer on that network. If a computer moves to a new network, it must be assigned a new IP address for that new network. DHCP can be used to manage these assignments automatically. DHCP carries other important configuration parameters such as the subnet mask, address of default router, addresses of domain name system (DNS) servers, addresses of time servers, etc. Using DHCP, a network administrator can avoid "hands on" configuration of the individual computers through complex and confusing set up applications. Instead, those computers can obtain all required configuration parameters automatically, without manual intervention, from a centrally managed DHCP server.

The DHCP server can be used to configure a DHCP client machine with two types of IP addresses. The first type of IP address, a dynamic address, is an address assigned to a client machine from a pool of addresses maintained by the DHCP server. These dynamic addresses are dynamic in that any address from the pool could get assigned to any particular client machine. The second type of address is a non-static reserved address. This type is an address that is reserved for a Media Access Control (MAC) address or some other client specific identifier. When a client machine sends that identifier; the assigned address is provided to it. Both of these types of addresses are assigned a lease time (lifetime) by the DHCP server. The lease on these addresses needs to be renewed by the client machine in order for them to stay valid. If the address leases are not renewed, the lease expires on the client and server, at which point the DHCP server reclaims the address and places it back in the pool for reuse for any other client machine.

While DHCP provides a centralized approach for a network administrator to assign and reclaim these dynamic and non-static reserve addresses, it does not provide for a mechanism to assign and reclaim static addresses for machines that need to be given addresses that never expire. Such machines, such as mission critical servers, are required to maintain their UP address unless and until a network administrator takes some manual action to provide for such change. This type of fixed address with no expiration time is referred to as a static or a permanent IP address. While the existence of such static or permanent IP addresses are mentioned in the DHCP Request For Comment (RFC)2131, it is silent on how the address, once assigned, can be reclaimed by a network administrator through the DHCP server. As such, the current DHCP protocol does not allow for reclaiming such addresses.

Not having a central control for static addresses makes the task of the network administrator very cumbersome, especially if there are many machines that need to be statically configured. In such a situation the network administrator is forced to physically go to each machine and assign/remove the static address therefrom. The administration must maintain a master list of statically assigned IP addresses so that these static addresses are not inadvertently assigned to two different machines, which would cause an address conflict. Such an address conflict will result in the disablement of one or both of the machines from communicating on the network.

While it is possible for a network administrator to assign a long lease time to a network client machine to effectively result in a pseudo-permanent assignment of the IP address, such a long lease time effectively removes the ability of the DHCP server in the network administrator from reclaiming that address until expiration of this lease time. This is problematic in a situation where the network administrator needs to reclaim the pseudo-permanent IP address prior to expiration of the lease time. The result is that this pseudo-permanent IP address is effectively removed from the network administrator's control until the expiration of the long lease time. If the network machine were to be replaced this IP address would be unavailable for reassignment to the replacement client machine until the lease time were to expire. This effectively prohibits the use of this pseudo-permanent IP address for any future communication until the lease time expires and the network administrator is able to assign the address to the new machine. However, unless it can be guaranteed that the machine to be replaced has been rendered permanently non-operational on TCP/IP networks or has had its IP address changed, the DHCP administrator cannot re-assign this address to the replacement machine since the possibility of and IP conflict situation is still present. In other words, if there is any non-zero possibility of the machine coming back on the network, the DHCP cannot re-assign that IP address to any other machine. Since the number of IP addresses available to be assigned by a DHCP server is limited, such effective removal of an IP address provides a double disadvantage. First, communication with that IP address is now no longer available because of the removal of the machine to which the lease was granted, and the total number of available IP addresses for the remaining machines in the network is reduced.

There exists, therefore, a need in the art for a system and method of assigning static or permanent IP addresses through a centralized DHCP server that also provides a mechanism for the retrieval and reassignment of these static or permanent IP addresses from the centralized DHCP server at the discretion of the network administrator.

SUMMARY OF THE INVENTION

The inventive concepts of the invention involve the assignment and retrieval of permanent/static addresses to/from networked machines through the Dynamic Host Configuration Protocol (DHCP) server. This enables a network administrator to manage all of the addresses for all networked machines through the centralized DHCP server, and in particular, allows the network administrator to reclaim a permanent or static IP address from a machine without having to physically go to the machine.

As discussed above, currently DHCP contains no method to retrieve static addresses. While the DHCP server can assign dynamic addresses and non-static reserved addresses, each of these two types of address assignable by the DHCP server all have a lease which must be renewed by the client machine in order for the address to maintain its assignment. If the client machine does not renew the lease on the address assigned by the DHCP server, the address is automatically revoked at the expiration of the lease period, and becomes available for assignment to another client. However, machines that require that their, IP address not change cannot afford to utilize a dynamic or non-static reserved IP address. Therefore, the system administrator must physically configure these critical servers at that server's physical location in order to provide this static address. The network administrator could assign a dynamic address with a lease time of infinity to effectuate a static address. However, if the system administrator needs to revoke that static address in either situation, he or she must physically return to the site of that machine to remove the address therefrom.

Under the system and method of the instant invention, a network administrator now has the ability to assign and, perhaps more importantly, remove static addresses in a fashion similar to the assignment of dynamic and non-static reserved addresses through the centralized DHCP server. As the name implies, these static address assignments have an infinite lifetime, and require no renewal mechanism as with these other types of addresses. The network administrator may also centrally reclaim these static addresses through the DHCP server without the necessity of physically going to each machine as required under the current system.

The assignment and indexing of such a static address follows a similar protocol as the assignment of the other types of IP addresses. If the client request for a static address came through a relay agent, the DHCP server of the instant invention stores the address of the relay agent in the static record before assigning the static address to it. In such a situation, this address is used to send a RECLAIM message as discussed more fully below.

The removal of static addresses is completely unique to the DHCP protocol. When an administrator wishes to remove a static address, the DHCP server sends a "DHCP RECLAIM" command to the machine (or through the relay agent as introduced above). The machine then sends and ACK and immediately removes its address. In an alternate embodiment, the machine does not send a separate ACK, but instead immediately removes its address and moves directly into the INIT state (the DISCOVER will serve as an ACK). Upon receipt of an ACK from the machine (or the DISCOVER in the alternate embodiment), the DHCP server removes the address from the "in use" database and places it in a FREE list of addresses that are available for assignment. If no ACK is received from the machine having the static address, the server marks this address as DEPRECATED and retries the transmission of the DHCP RECLAIM command for a user defined number of times. The DHCP server also starts a timer with a maximum lifetime after which the DHCP server will change the status of that static address from DEPRECATED to FREE indicating that it is available for reassignment to a new machine. This prevents the effective elimination of that address from the list of available addresses in the case where the machine having that permanent address assignment has been permanently removed from the network. This mechanism will not result in the dual assignment of static IP addresses since upon rebooting or reconnection to the network of the machine having this static address it will send a DHCP RENEW to check its location. It should be noted that while this RENEW message for the other kinds of addresses serves the purposes of checking the location, verifying the validity of the address assignment if the node is still on the right network, and renewing the lease assignment if so, the static address assignment does not have a lease to renew. Therefore, the name RENEW is somewhat of a misnomer for what this message does in the case of static addresses. Upon receipt, the DHCP server will transmit a NACK to the machine, which will cause the machine to enter the INIT state of the DHCP protocol state machine.

The system of the instant invention also provides security mechanisms implemented by machines having the static address assignment to protect them from a malicious attacker that sends rogue RECLAIM packets. In one embodiment, a security mechanism is provided by requiring that the statically assigned machine verify the source IP address in the IP header of the RECLAIM packet to make sure that it has been received from the DHCP server from which the machine received its static address. However, since an attacker can spoof the source IP address, a stronger security mechanism is provided that requires the statically assigned machine to issue a challenge to the DHCP server for additional confirmation. As a further alternative security mechanism, an alternate embodiment of the invention provides that the DHCP server establish an IPSEC security association (SA) with the machine that has the statically assigned IP address. Thereafter, the RECLAIM packet is sent using this SA so that the machine can actually authenticate the source as being the DHCP server. Various authentication's schemes are available under IPSEC, the particulars of which are beyond the scope of this invention.

As may now be appreciated, the system and method of the invention allows an administrator to reserve static addresses for machines on a DHCP server. These static address assignments have an infinite lifetime. The reservation and indexing of such addresses is similar to that for non-static reservations. The invention also allows the administrator to reclaim the address from the DHCP client if required. This obviates the need for an administrator to do this through the network control panel of the machine or through a local/remote script. Further, the system and method of the invention allows the administrator to see all addresses, Dynamic, Reserved, and Static in one place, i.e. in the DHCP database. This reduces the probability of conflicts due to mistaken reuse of addresses' while they are still active on a machine. A single clearinghouse for all addresses on the network reduces the probability of multiple assignments. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 8 is a simplified control flow diagram from the DHCP client side to effectuate the communication of FIG. 6.

DETAILED DESCRIPTION OF THE INVENTION

Figure 1:
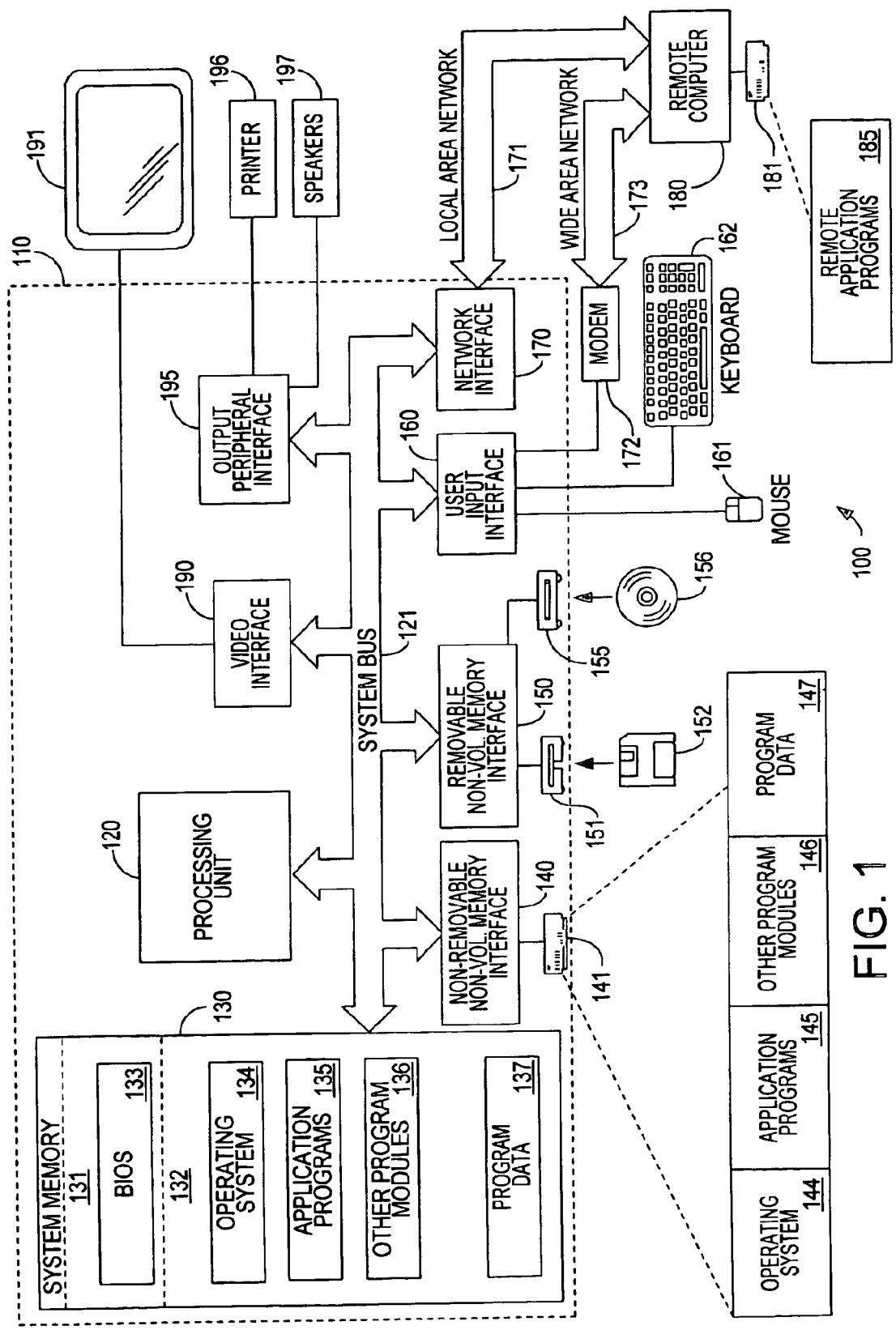
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer; unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In accordance with the teachings of one embodiment of the instant invention, the DHCP server setup and the assignment of a static address to a DHCP client is similar to the setup of a reserved address conventionally available through the DHCP server. However, the lease time of the static address is infinite. Another difference is that if the static address belongs to a non-local network (the DHCP server may be servicing non-local networks), then the DHCP server stores the address(es) of the relay agent(s) that is(are) forwarding client requests to the DHCP server. These addresses are stored so that the RECLAIM message can be sent to the relay agents serving the nodes of the network to which the static address belongs when the static addresses are to be reclaimed. Likewise, the static address is removed from the client through the central DHCP server in a manner similar to the reserved address from the network administrator's user interface (UI). However, the actions taken by the DHCP server as a result of this removal process of the static address are quite different from those currently existing for the removal of a non-static reserved address. Indeed, as discussed above, the governing standard for DHCP, RFC2131, does not provide or discuss any mechanism for the removal of static or permanent addresses through the centralized DHCP server. The following description, therefore, will focus on the details implemented within the centralized DHCP server in accordance with the instant invention that allows it to perform such removal. The reservation process will also be described, however since the mechanisms for such address assignment are well known, the following description will focus on the areas of differences between current DHCP practice as required by the instant invention.

Figure 2:
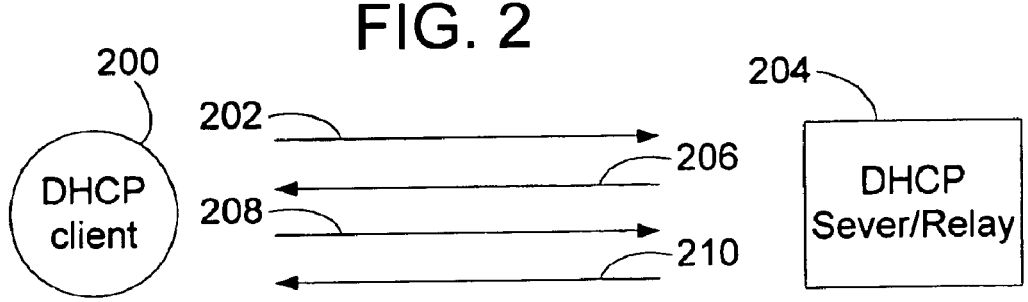
FIG. 2 is a simplified communication flow diagram illustrating the DHCP communication required to obtain a static address in accordance with the system and method of the instant invention.

As illustrated in FIG. 2, when a DHCP client machine 200 initially boots onto the network, it transmits a DHCP DISCOVER 202 to the DHCP server 204 in an attempt to obtain an IP address. The DHCP server 204 analyzes the DISCOVER request 202 to determine the type of IP address to be assigned thereto. The DHCP server 204 analyzes the media access control (MAC) address and the client identifier field for the DHCP client 200 that has sent the DISCOVER request 202. If the DHCP client's MAC address/client identifier matches a reservation within the DHCP server 204 for the provision of a static address, the DHCP server 204 responds with an offer 206 containing the static IP address. The DHCP client 200 then responds with a request (DHCP RENEW) 208. To acknowledge receipt of this request and finalize the assignment of the static IP address, the DHCP server 204 transmits an acknowledgment (ACK) 210 to the DHCP client 200 to complete the assignment of the static IP address. If the DHCP DISCOVER and RENEW packets from the client came through a relay agent that the DHCP server does not already have in its list of relay agents servicing the client's network, it stores the address of the RELAY agent in its list. As will be recognized by those skilled in the art, while this FIG. 2 illustrates one block 204 for the DHCP server/relay, the relay is actually between the server and the client.

Figure 3:
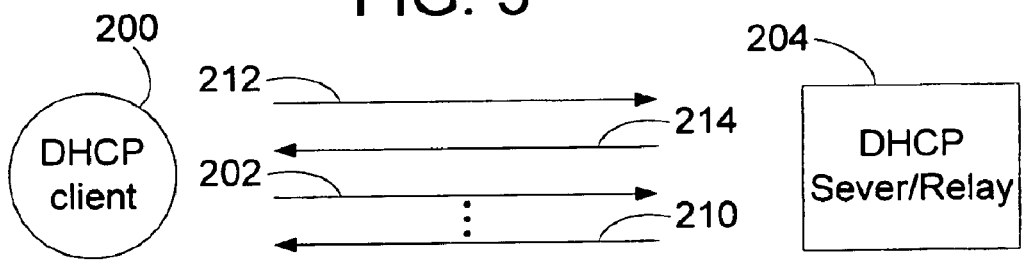
FIG. 3 is a simplified communication flow diagram illustrating the DHCP mechanism utilized in accordance with the instant invention once a machine whose static address has been set to the DEPRECATED or FREE state seeks to renew its address.

If, upon initial booting, resuming from standby or hibernation, or on a media connect to the network, of the DHCP client 200, the client 200 discovers that it has currently assigned an IP address, it will instead initially transmit a RENEW request 212 containing the currently assigned IP address from the perspective of the DHCP client 200. If the DHCP server 204 has marked this IP address to the DEPRECATED or FREE state (the details of which will be described more fully below), the DHCP server 204 will respond with a negative acknowledgment (NACK) 214. Upon receipt of the NACK 214, the DHCP client 200 will give up its address and enter the normal DISCOVER procedure described with regard to FIG. 2 as indicated by the transmission of the DISCOVER request 202 in this FIG. 3. The DHCP procedure for the assignment of a new static address will proceed as illustrated in FIG. 2 until the transmission of the acknowledgment (ACK) 210 illustrated in FIG. 3.

Figure 4:
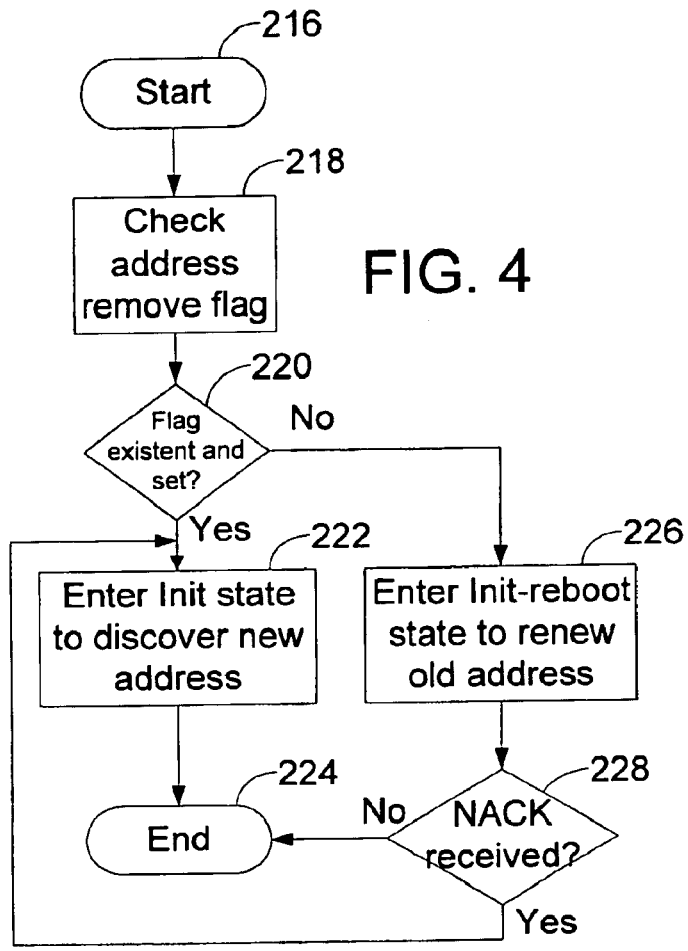
FIG. 4 is a simplified control flow diagram illustrating the DHCP client actions required to effectuate the communication illustrated in FIGS. 2 and 3.

The procedure that takes place within the DHCP client 200 for each of the above-described procedures is illustrated in the simplified flow diagram of FIG. 4, to which specific reference is now made. When a DHCP enabled client machine boots 216, resumes or on a media connect, it starts the DHCP protocol in preparation for requesting or renewing an IP address. Upon booting, resuming, or a media connect 216, the client checks an "address remove" flag 218 (the significance of which will be described more fully below) to determine the type of procedure it should follow. If this flag is set 220, the DHCP client enters the initialization (INIT) state to discover a new IP address as illustrated in block 222. The processing of this control block 222 proceeds with the communication as is illustrated in FIG. 2 described above, before ending 224. If, however, at step 220 the DHCP client discovers that the "address remove" flag is not set, the DHCP client enters the initialization reboot (INIT_REBOOT) state to renew the old IP address contained therein at processing block 226. The procedure of this control block 226 is accomplished through the communications illustrated and described above with regard to FIG. 3. If a NACK is received 228, the DHCP client enters the INIT state to discover a new IP address as illustrated in control block 222 before ending 224. If, however, a NACK is not received, the process ends 230 with the renewal of the IP address currently assigned within the DHCP client 224. This renewal is issued by the DHCP client to check whether it is on the same network after a move between networks or after it comes out of a hibernation/suspend mode.

Figure 5:
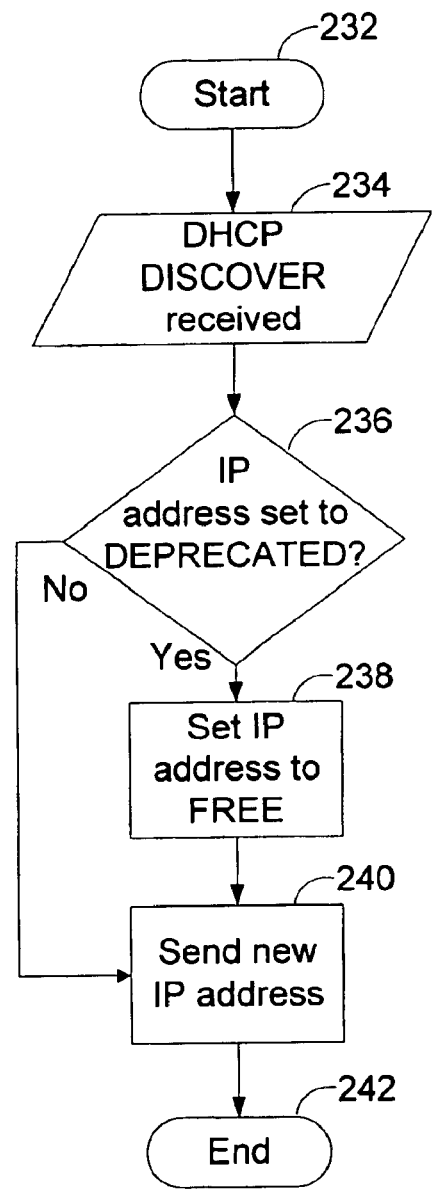
FIG. 5 is a simplified control flow diagram from the perspective of the DHCP server to effectuate the communication illustrated in FIGS. 2 and 3.

The processing during this period within the DHCP server is accomplished as illustrated in the simplified flow diagram of FIG. 5, to which reference is now made. Once this processing begins 232 and the DHCP server has received a DHCP discover message 234 from one of its DHCP clients, the server checks to determine if the IP address in the discover message is currently set to the DEPRECATED state at decision block 236. If the IP address has been set to the DEPRECATED state, the DHCP server then sets the IP address to the FREE state at control block 238, and thereafter provides a new IP address 240 to the DHCP client through the above-described process before ending 242. If, however, at decision block 236 it is determined that the IP address in the discover request has not been set to the DEPRECATED state, i.e. it is already FREE or assigned to some other machine, the DHCP server merely moves to provide a new IP address to the client as described above.

If the client request comes through a relay agent, the DHCP server stores the address of the relay agent in a static record (since the relay agent(s) are common to all nodes on the client's network, it is likely to be stored as part of the global network configuration for the client's network) before assigning the static address to it. This address is used to send a RECLAIM message as will be described more fully below. If the relay agent address changes, this address will become obsolete. To account for this, the system of the instant invention utilizes a protocol between the relay agents and the DHCP servers that they serve that allows a DHCP server to know the relay agents for a particular subnet. In this way, the DHCP server knows all the relay agents serving the net of the client's given static addresses. This transference of information may take place via a private protocol, or this information may be obtained by the DHCP server through the Active Directory (part of the DHCP server's or the network's configuration) or through discovery protocols such as UPnP or SLP.

Turning now to the illustration of FIG. 6, the DHCP server-initiated removal of a static address will be discussed. Upon determination by the network administrator that a static address previously assigned to a DHCP client is to be removed, the DHCP server 204 sends 244 a DHCP RECLAIM command to the DHCP client 200. This command is sent as a UDP message directly to the client 200 at its "to be removed" IP address. This is so if the client 200 is on the same LAN as the DHCP server. If it is not, the DHCP server sends the packet to the relay agent for the machine. In response to the RECLAIM message, the DHCP client 200 transmits an acknowledgment (ACK) 246 to the DHCP: server 204. If this ACK is received by the DHCP server, the IP address is removed from the DHCP server's "in use" database (STATE of address equals ACTIVE) and moved to a FREE list (STATE of address equals FREE) so that it can be assigned to another machine. If, however, the DHCP client 200 is not connected to the network or is not in a state capable of responding (suspend/hibernate/shutdown), or if the ACK gets dropped in transit as indicated in FIG. 6, the DHCP server 204 retries a number of times the transmission of the RECLAIM packet as indicated by transmission lines 248 and 250.

In an alternate embodiment of the invention, the client does not send an ACK on getting a RECLAIM. Instead, it simply removes the address and enters the INIT state directly. The DHCP server on getting a DHCP DISCOVER message from the client will find that the client already has a static address assigned (in DEPRECATED state). It will therefore move the address to the FREE state before giving an address to the client. This embodiment of the invention overloads the purpose of the DISCOVER message to also serve as an ACK for a previous RECLAIM from the DHCP server. This embodiment of the invention is particularly useful if one wanted to cut down on the number of messages between the client and server. Such situations include, but are not limited to, wireless connectivity (having bandwidth constraints) between the client and the server. This reduces the number of messages to 1 (RECLAIM only) to accomplish this functionality.

Figure 6:
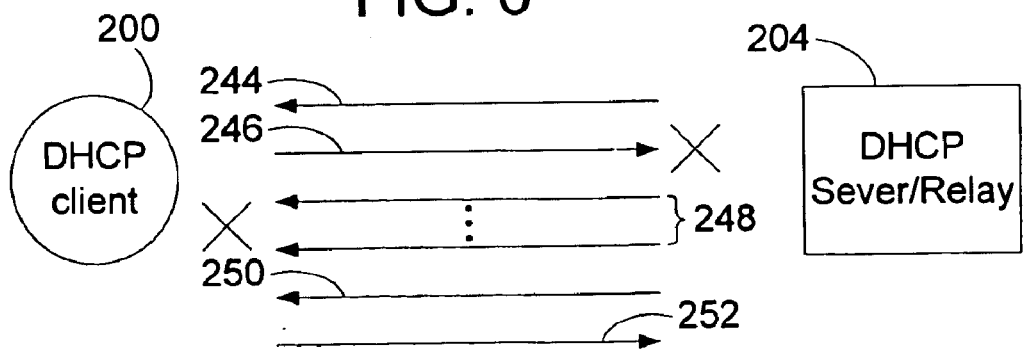
FIG. 6 is a simplified communication flow diagram illustrating the reclamation of a static address by the DHCP server/relay agent in accordance with the teachings of the instant invention.

As indicated in FIG. 6, the retries of the RECLAIM command transmission indicated by lines 248 are either not received by the DHCP client 200 or are transmitted to the DHCP client when it is in a state in which it cannot respond (suspend/hibernate/shutdown) or is simply not connected to the network. However, upon transmission 250 of the RECLAIM command, the DHCP client receives the RECLAIM command. Since the DHCP client has previously acknowledged (see transmission 246) the RECLAIM command, the client 200 responds with a negative acknowledgment (NACK) 252. Once this NACK is received by the DHCP server 204, the server 204 changes the state of the address to FREE.

For the case when the DHCP client 200 was off of the network when the RECLAIM commands were being sent, when the client 200 comes back onto the network (powers up/resumes/or gets physically connected to the network), the DHCP client 200 will perform a DHCP RENEW, i.e. start from the DHCP INIT_REBOOT state as described above with respect to FIGS. 3 and 4. Since the DHCP server 204 has DEPRECATED or marked FREE the IP address (as will be described more fully below), the DHCP client 200 will receive a negative acknowledgment in response to its renew request in the INIT_REBOOT state from the DHCP server 204. As a result, it will give up the IP address, go to the INIT state and restart the DHCP protocol by sending a DHCP DISCOVER request to get a new address as described above with regard to FIGS. 2 and 4. On receiving the DHCP discover request from a machine whose IP address is in the DEPRECATED state, the DHCP server changes the state to FREE, and sends a different address or the same address (in the case where the address has been made to be a dynamic or reserved address by the network administrator) to the machine in response to its DISCOVER as determined by the network administrator's policy.

Figure 7:
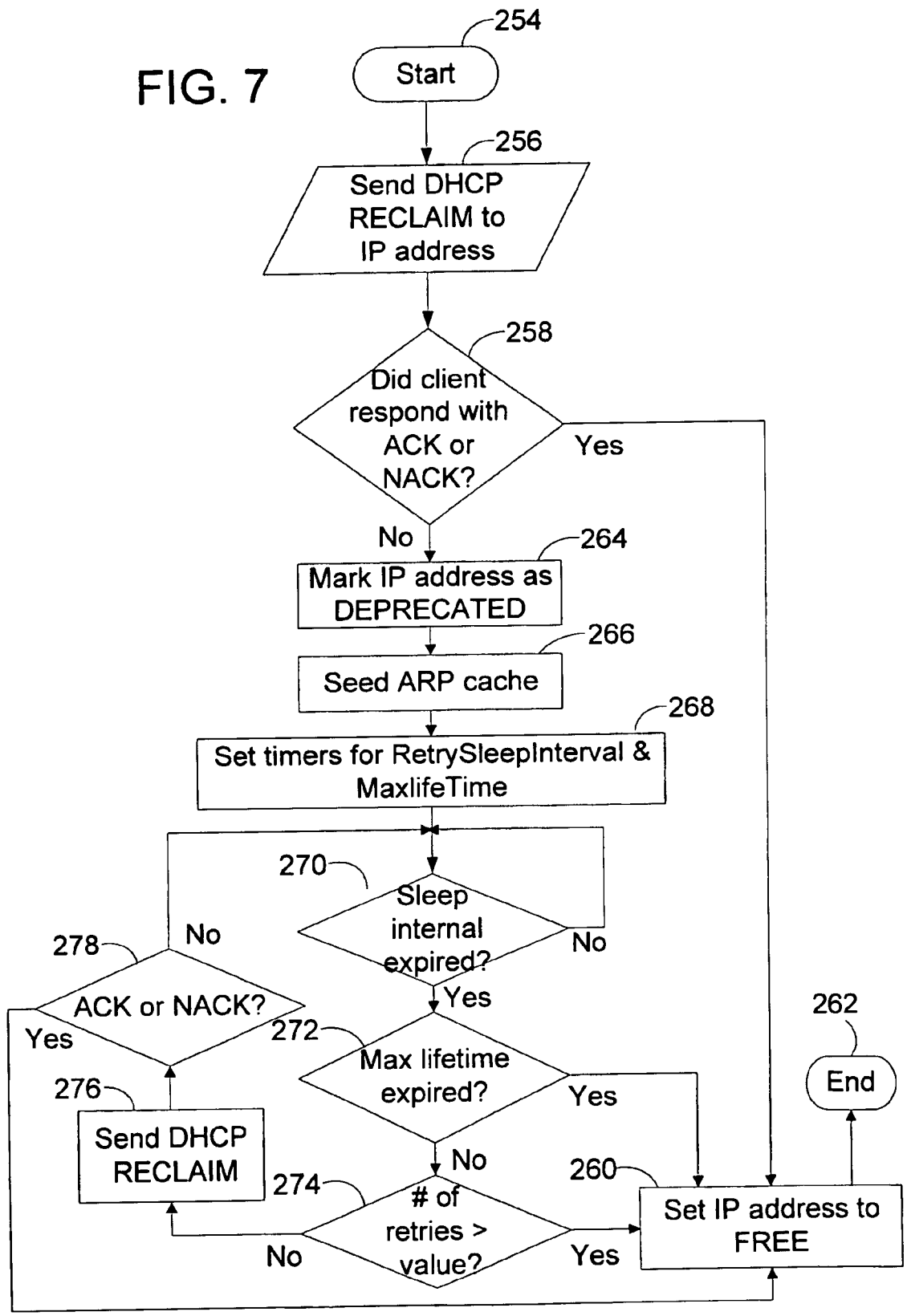
FIG. 7 is a simplified control flow diagram illustrating the DHCP server actions to effectuate the communication illustrated in FIG. 6.

Having now described the basic communication flow between the DHCP server and the DHCP client during a RECLAIM process, the details of this process will now be discussed with regard to FIG. 7 on the DHCP server side, and with regard to FIG. 8 on the DHCP client side. Turning first to FIG. 7, upon institution of the DHCP RECLAIM process 254, the DHCP server transmits the DHCP RECLAIM command, to the IP address of the machine at its "to be removed" IP address (or to the IP address of its relay agent) as indicated by control block 256. If the DHCP client responds with either an ACK or a NACK as determined by decision block 258, the DHCP server changes the state of the IP address to FREE at control block 260 before ending the RECLAIM process 262. If, however, the client has not responded with an ACK or a NACK, the DHCP server changes the state of that IP address to DEPRECATED at control block 264. The DHCP server then seeds its address resolution protocol (ARP) cache 266 if no relay agent is involved. If the DHCP server is on a different network than the client, the DHCP server will not do this since it will be sending the RECLAIM to the relay agent. On getting a RECLAIM, the relay agent will seed its ARP cache (some relay agents do the same seeding when they have to send the OFFER packet since they know that the client does not have any address, other relay agents may use other mechanisms such as constructing the entire packet along with the IP and MAC addresses themselves and sending it). As will be recognized by those skilled in the art, ARP is a TCP/IP protocol for determining the hardware address (or physical address) of a node on a local area network, when only the IP address (or logical address) is known. An ARP request is sent to the network, and the node that has the IP address responds with its hardware address. This information is needed because the IP address may have actually been removed by the DHCP client, but the ACK may have simply become lost in transit before being received by the DHCP server as illustrated in FIG. 6.

Once the state of the IP address has been changed to DEPRECATED and the ARP cache has been seeded (for the local LAN case; for the remote client case the relay agent will seed its ARP cache as explained above), the DHCP server then starts a periodic timer (RetrySleepInterval) and a maximum lifetime (MaxLifeTime). The RetrySleepInterval timer is the time that the DHCP server waits before retransmitting a DHCP RECLAIM command to the DHCP client. The MaxLifeTime is the time after which the state of the address will be changed from DEPRECATED to FREE regardless of receiving any response from the DHCP client. These timers, both of which are configurable by the network administrator, are setup in an attempt to assure communication with the DHCP client at points after which a DHCP client should be reconnected to the network. At some point, however, it is assumed that a lack of response from the DHCP client is due to a catastrophic failure of the client or a permanent removal of the client from the network. Once this MaxLifeTime has passed, the IP address is then moved back to the FREE pool of IP addresses so that the network administrator may then reutilize this IP address for another DHCP client machine.

Once the setting of these timers has taken place 268, each are checked 270, 272 to determine if it is appropriate to retransmit a DHCP RECLAIM command. If the RetrySleepInterval has expired and the MaxLifeTime has not yet expired, the DHCP server next checks to determine if the maximum number of retries has been exceeded at decision block 274. As with the timer values, the maximum number of times that the DHCP server will retry the transmission of the DHCP RECLAIM command is preferably configurable by the network administrator. If the DHCP has not yet exceeded its maximum allowable number of retries, it will then retransmit 276 the DHCP RECLAIM command to the DHCP client. If the DHCP server thereafter receives an ACK or a NACK at decision block 278, the DHCP server will change the state of the IP address to the FREE state 260 before ending 262. If, however, there is no receipt of an ACK or a NACK at decision block 278, the DHCP server will again hold until the expiration of the RetrySleepInterval or MaxLifeTime at decision blocks 270, 272. As indicated in FIG. 7, once the MaxLifeTime expires 272, the state of the IP address is automatically changed to FREE to preclude the effective loss of this static IP address in the case where the DHCP client has been permanently removed from the network. Likewise, once the number of retries exceeds the maximum allowed at decision block 274, the state of the IP address is also changed to FREE.

Within the DHCP client, the process of releasing a static IP address is illustrated in the flow diagram of FIG. 8 to which attention is now directed. Once this process begins 280 and the DHCP RECLAIM command is received 282, the DHCP client first checks to determine if the IP address is valid 284. If the IP address is not valid, as may be the case where the DHCP client has previously received a RECLAIM command but where the ACK is dropped before reaching the DHCP server, the DHCP client sends a negative acknowledgment (NACK) 286 before ending 288. If, however, the IP address is valid at decision block 284, the DHCP client marks the IP address for removal in its registry by setting an "address remove" flag to TRUE at control block 290. Thereafter the DHCP client transmits an ACK 292 to the DHCP server (the function of the ACK may also be served by entering the INIT state as described below without sending of a separate ACK). When the client, on a reboot/resume/media connect finds that the "address remove" flag is true, it will enter the INIT state and so send a DISCOVER that will double for the ACK as far as the DHCP server is concerned. Note that the DHCP DISCOVER packet format is not changed at all. After sending the ACK 292, the DHCP client removes the address and marks the "address remove" flag in its registry to FALSE or simply removes the flag at control block 294. This setting of the "address remove" flag to TRUE prior to removing the address ensures that if the machine crashes right after transmitting the ACK but before the address has been removed, it will not enter the INIT_REBOOT after rebooting. This state is to be avoided to preclude the situation where the address was previously reclaimed and the DHCP server fails to respond to the DHCP renewal request from the client; in such a situation the DHCP client maintains the old IP address. Once this flag has been removed 294, the DHCP client will enter the DHCP INIT state 296 to get a new IP address from the DHCP server before ending 288.

As mentioned briefly above, there is a non-zero possibility that despite the repeated RECLAIM commands transmitted by the DHCP server, the DHCP client may still maintain its static IP address. This situation could happen when a legacy machine (a machine that is non-media sense aware) is off the network when the RECLAIM commands are sent. Once such a legacy machine is reconnected to the network, since it does not have media sense, it does not know that it got reconnected and so does not send a RENEW message. This situation could also occur if all RECLAIM packets from the DHCP server were somehow lost on the network, and therefore, were never received by the DHCP client. Alternatively, if the DHCP client were off the network when all of the RECLAIM commands were being sent, and when the client is reconnected to the network, it does a DHCP RENEW and its associated retries, but all of these RENEW messages or the NACKs from the DHCP server for the RENEW are lost on the network and so are never received by the other machine. In these situations there is a possibility of IP address conflict if the address of the DHCP client gets reassigned to another machine.

To minimize the possibility of such an address conflict, one embodiment of the DHCP server performs conflict detection before assigning an address. Likewise, a DHCP client may perform conflict detection through the generation of gratuitous ARPs upon getting a new IP address. In this way, once it discovers the conflict, the DHCP client can send a DHCP DECLINE packet to the DHCP server, thus informing it of the conflict. The DHCP server then marks the address as BAD and the administrator is alerted through an alerting mechanism such as discussed in the RFC2131. After sending the DECLINE packet, the client enters the INIT state in order to request a different address.

The administrator can further minimize the possibility of conflict by keeping a MaxLifeTime large enough such that it is greater than the largest off-net time interval expected for any DHCP client under any circumstance. Further, the DHCP server can be run on a cluster to ensure full power and high availability to minimize the probability of a DHCP server being down when a DHCP client that gets reconnected to the network sends a RENEW command. Additionally, the DHCP administrator can still manually remove the address from a machine and the DHCP database. Thus, in the case where the MaxLifeTime is high but the address needs to be reclaimed faster for reuse, the administrator can physically go to the DHCP client machine whose address is DEPRECATED, remove the address from there, and then change the state of the address in the DHCP database to FREE. While this reverts to the manual process, its likelihood of actually being needed under the system of the instant invention is very low. In practice, static reserved addresses are typically only given to mission-critical servers that are generally not mobile, and therefore, their absence from the network will be minimal. Likewise, due to the mission critical nature of these servers, their downtime will be exceedingly small, and therefore, will be likely to receive at least one of the RECLAIM retries transmitted from the DHCP server. Therefore, the RECLAIM process of the instant invention has an exceedingly high probability of success in reclaiming static IP addresses from the centralized DHCP server.

A DHCP client configured with the static address by a DHCP server in accordance with the system of the instant invention needs to protect itself from a malicious attacker that sends rogue RECLAIM packets to it. While, as a minimum, the DHCP client receiving the RECLAIM packet should ensure that the source IP address in the IP header of the RECLAIM packet is that of the DHCP server from which the DHCP client received its static address, this mechanism provides only weak security since an attacker can spoof the source IP address. While stronger security is provided by having the DHCP client receiving the RECLAIM packet obtain confirmation for the RECLAIM from the DHCP server through a challenge mechanism, a malicious attacker may also be able to work around this. Therefore, in one embodiment of the present invention the DHCP server establishes an IPSEC security association (SA) with the DHCP client to which it has to send the RECLAIM packet. This RECLAIM packet is then sent using this SA so that the DHCP client can authenticate the source as being the actual DHCP server and not a malicious attacker. Numerous authentication schemes may be utilized under IPSEC, the details of which are well known in the art.

One may note that in an embodiment of the invention that secures DHCP RECLAIMs using IPSEC, then if the client removes its address as a result of getting the RECLAIM packet but the DHCP server does not come to know of this because the ACK or all the DISCOVER packets (DISCOVER is retried when client does not hear a response from the server to its earlier DISCOVERs) from the client get lost, the DHCP server's subsequent RECLAIMs (the retries) sent under the IPSEC Security Association (SA) will be just dropped by the client since it does not have the IPSEC SA state anymore (the IPSEC state is specific to the address; if the address is gone, the state is gone). In this case, the DHCP server will not hear back any response to the RECLAIMS. So it will flush the IPSEC state for that machine and send the RECLAIM without using IPSEC. The client will now respond with a NACK which will result in the DHCP server moving the address to FREE. In other words, if the DHCP server does not hear any response when trying an IPSEC secured RECLAIM, it can deduce that this could be because the client already has lost the address and is rejecting all subsequent RECLAIMS since they are coming under an old SA and so try sending the RECLAIM without IPSEC.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Additionally, one skilled in the art will recognize that while the above description of the invention focused on the application of the methods described to static IP addresses, the methods of the invention are likewise applicable to the reclaiming of dynamic addresses and reservations also. In the case of dynamic addresses and reservations, the address will stay in the DEPRECATED state, in the absence of any communication with the client, until the lower of MaxLifeTime, lease time granted to the client, and the time it takes to exhaust all retries. Therefore, the invention as described herein contemplates all such embodiments as may come within the scope of the following claims and equivalents thereof.

I claim:

1. A method of reclaiming static IP addresses from a client machine connected to a network utilizing a dynamic host configuration protocol (DHCP) server, comprising the steps of:
   sending a DHCP RECLAIM command to the client machine having the static IP address to be reclaimed;
   setting a state of the static IP address to be reclaimed to FREE;
   wherein the step of setting a state of the static IP address to be reclaimed to FREE is dependent on a step of receiving an acknowledgment of the DHCP RECLAIM command from the client machine; and
      further comprising the step, performed before the step of setting a state of the static IP address to be reclaimed to FREE, of setting a state of the static IP address to be reclaimed to DEPRECATED.

2. The method of claim 1, further comprising the step of seeding an address resolution protocol (ARP) cache with a physical address of the client machine.

3. The method of claim 1, further comprising, while the state of the static IP address to be reclaimed is DEPRECATED, the steps of:
   receiving a DHCP DISCOVER request from the client machine having the static IP address whose state is DEPRECATED;
   setting the state to FREE; and
   sending an IP address to the client machine.

4. The method of claim 1, further comprising, while the state of the static IP address to be reclaimed is DEPRECATED, the steps of:
   receiving a DHCP RENEW request from the client machine having the static IP address whose state is DEPRECATED; and
   sending a NACK to the client machine.

5. The method of claim 1, further comprising the step of re-transmitting after the expiration of an interval the DHCP RECLAIM command.

6. The method of claim 5, wherein the step of re-transmitting is performed for maximum a preset number of times.

7. The method of claim 1, further comprising the step of setting the state to FREE after a maximum lifetime of the DEPRECATED state.

8. A computer-readable media having stored thereon computer-executable instructions for performing the method of claim 1.

9. A method of connecting to a network to achieve an IP address through DHCP, comprising the steps of:
   determining whether a current IP address exists;
   determining whether the current IP address is marked for removal;
   entering a DHCP INIT state when there is no current IP address;
   entering a DHCP INIT state when the current IP address is marked for removal;
   entering DHCP INIT REBOOT state when the current IP address is not marked for removal; and
   wherein after performing the step of entering a DHCP INIT_REBOOT state, further comprising the step of entering the DHCP INIT state if a negative acknowledgment (NACK) is received in response to the step of entering a DHCP INIT_REBOOT state.

10. A method of assigning an IP address to a client machine from a dynamic host configuration protocol (DHCP) server, comprising the steps of:
    receiving a DHCP DISCOVER request from a client;
    determining whether an IP address in a DEPRECATED state is currently assigned to the client;
    setting the state of the IP address to FREE if there is an IP address in a DEPRECATED state assigned to the client; and
    providing a new IP address to the client.

11. A computer-readable media having stored thereon computer-executable instructions for performing the method of claim 10.

12. A method of assigning an IP address to a client machine from a dynamic host configuration protocol (DHCP) server, comprising the steps of:
    receiving a DHCP RENEW request from a client;
    determining whether an IP address in a DEPRECATED state is currently assigned to the client;
    setting the state of the IP address to FREE if there is an IP address in a DEPRECATED state assigned to the client; and
    sending a negative acknowledgment (NACK) to the client.

13. A computer-readable media having stored thereon computer-executable instructions for performing the method of claim 12.

* * * * *